G. H. Mallary,
Cutter Head.
Nº 19,035.   Patented Jan. 5, 1858.

Inventor
G. H. Mallary

UNITED STATES PATENT OFFICE.

G. H. MALLARY, OF NEW YORK, N. Y.

METHOD OF DOVETAILING ROTARY CUTTERS IN THEIR HEADS.

Specification of Letters Patent No. 19,035, dated January 5, 1858.

*To all whom it may concern:*

Be it known that I, G. H. MALLARY, of the city, county, and State of New York, have invented certain new and useful Improvements in Planing-Cylinders for the Purpose of Making Them Track the Cutters Perfectly After Grinding; and I do hereby declare and ascertain my said improvement, referring to the accompanying drawing, in which—

Figure 1:
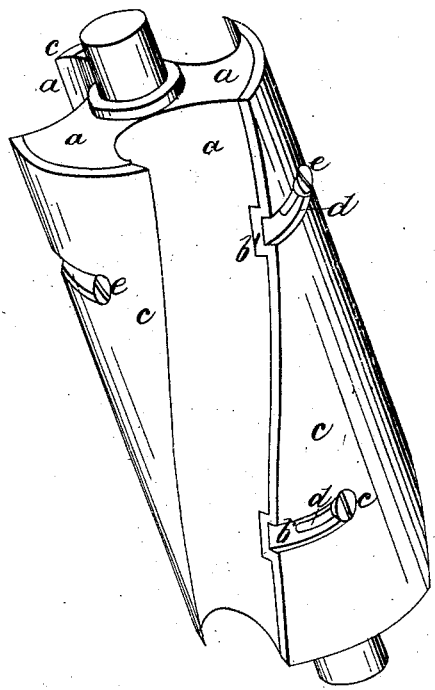
Figure 3:
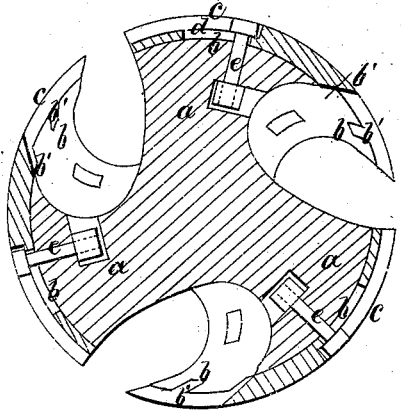
Figure 2:
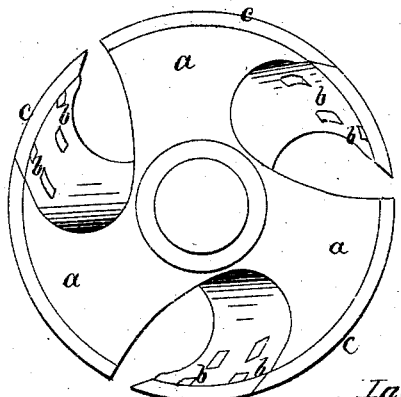

Figure 1, is a perspective projection of the cylinder; Fig. 2, an end view; Fig. 3, a section.

My improvement consists in forming my cutters in the segment of a cylinder of the size of the cutting cylinder and placed in a spiral direction around said cylinder and in the mode of attaching the same for use.

The cylinder is formed in all particulars like the ordinary cylinder for planing machines except the arms which instead of being extended on a line parallel with the axis wind around it in a spiral direction as is evident from the drawing. There are on the cylindrical surfaces of the arms $a$ two or more grooves $b$ dovetailed for receiving tongues $b'$ on the cutter $c$. The cutters $c$ are plates of properly tempered steel or steel and iron welded bent into the same curve as the beds or outer surfaces of the arms as aforesaid. The outer surfaces of the cutters are made by turning or otherwise a true cylindrical figure and wind around in the spiral form of the arms. On their under surfaces are tongues or ribs $b'$ to fit into the groove in the cylinder arms. The surface of the knives or cutters $c$ are pierced with an oblong hole at $d$ and directly over the ribs $b'$ there being a recess there in the face for the purpose of receiving the head of a screw bolt $e$ the shank of which passes through the cutter and arm and receives a nut on its under side in the throat of the arm; thus fastened the cutter edge is formed on the outer periphery by beveling on the underside so as to be on the line of revolution whether set more or less forward so that all the cutting edges must track however carelessly they are set.

I do not claim a spiral cutter or a cutter made straight on the outer surface of the arm but—

Having thus described my cylinder planing cutter I claim—

The mode herein described of attaching spiral cutters to the curve segmental surface of the arms by tongues and grooves for the determination of their proper position, and for forming recesses for the heads of the bolts by which they are affixed all as herein fully set forth.

G. H. MALLARY.

Witnesses:
WM. P. CHAMBERS,
PETER STARR.